United States Patent
Agami et al.

(10) Patent No.: US 6,820,108 B2
(45) Date of Patent: Nov. 16, 2004

(54) METHOD AND APPARATUS TO PERFORM DIVISION IN HARDWARE

(75) Inventors: Gregory Agami, Arlington heights, IL (US); Ron Rotstein, Arlington Heights, IL (US); Robert J. Corke, Glen Ellyn, IL (US)

(73) Assignee: Motorola, Inc., Schaumburg, IL (US)

( * ) Notice: Subject to any disclaimer, the term of this patent is extended or adjusted under 35 U.S.C. 154(b) by 541 days.

(21) Appl. No.: 09/949,331

(22) Filed: Sep. 7, 2001

(65) Prior Publication Data

US 2003/0050950 A1 Mar. 13, 2003

(51) Int. Cl.[7] .................................................. G06F 7/50
(52) U.S. Cl. ..................................................... 708/653
(58) Field of Search .......................................... 708/653

(56) References Cited

U.S. PATENT DOCUMENTS

| | | | | |
|---|---|---|---|---|
| 4,555,768 A | * | 11/1985 | Lewis et al. | 708/625 |
| 4,636,973 A | * | 1/1987 | Cantwell | 708/653 |
| 5,132,925 A | * | 7/1992 | Kehl et al. | 708/653 |
| 5,442,581 A | * | 8/1995 | Poland | 708/653 |

* cited by examiner

*Primary Examiner*—D. H. Malzahn
(74) *Attorney, Agent, or Firm*—Kenneth A. Haas

(57) ABSTRACT

In accordance with the preferred embodiment of the present invention a gain (A) is determined and utilized to cyclically converge upon a quotient (Q). More particularly, once A is determined, an estimate of $Q_N$ is multiplied by Y to estimate $\hat{X}_N$, where Q=X/Y. The value of $\hat{X}_N$ is then subtracted from X to determine an error ($e_N$), which is multiplied by A. The value of $Ae_N(n)$ is added to $Ae_N(n-1)$ to produce an estimate of Q. Once convergence has occurred, the value for Q is output from the circuitry.

10 Claims, 5 Drawing Sheets

METHOD AND APPARATUS TO PERFORM DIVISION IN HARDWARE

FIELD OF THE INVENTION

The present invention relates generally to performing division and in particular, to a method and apparatus for performing division in hardware.

BACKGROUND OF THE INVENTION

An operation which is often avoided in hardware implementations is the divide operation. This operation is most often avoided because of the processing time required to execute the operation. For example, prior art dividers perform long division via a "conditional subtract" algorithm, requiring at least 2N clocks, where N is the number of dividend bits. In order to solve this problem, prior art systems approximate a division using a multiplication algorithm. However, as system performance requirements increase, approximations of mathematical operations are becoming less tolerable. Therefore, a need exists for a method and apparatus for performing division in hardware that requires relatively little processing time, and yields a more accurate result than current approximation methods.

DETAILED DESCRIPTION OF THE DRAWINGS

To address the above-mentioned need, a method and apparatus for performing division in hardware is provided herein. In accordance with the preferred embodiment of the present invention a gain function (A) is determined and utilized to cyclically converge upon a quotient (Q). More particularly, once A is determined, an estimate of $Q_N$ is multiplied by Y to estimate $\hat{X}_N$, where Q=X/Y. The value of $\hat{X}_N$ is then subtracted from X to determine an error ($e_N$), which is multiplied by A. The value of $Ae_N(n)$ is added to $Ae_N(n-1)$ to produce an estimate of Q. Once convergence has occurred, the value for Q is output from the circuitry.

In accordance with the preferred embodiment of the present invention, the time required to converge to the correct solution is independent of the operand bit width and is instead a function of the loop gain. That is, while the prior art execution time increases linearly with operand bit width, execution time can be made to remain relatively constant over operand bit widths. This results in dividing circuitry that requires relatively little processing time to execute, and yields a more accurate result than current approximation methods.

The present invention encompasses dividing circuitry for dividing X/Y to produce Q. The dividing circuitry comprises a mixer having Y as an input and outputting an estimate of X ($\hat{X}$), a first summer having $\hat{X}$ and X as inputs and outputting an error (e), a multiplier having e and a gain (A) as inputs and outputting a value of e multiplied by A, and a second summer having the value of e multiplied by A as an input and outputting an estimate of Q.

The present invention additionally encompasses a method to determine a value of Q, where Q=X/Y. The method comprises the steps of determining a gain function (A), multiplying an estimate of Q by Y to produce an estimate of X ($\hat{X}$), and subtracting $\hat{X}$ from X to determine an error (e). The value of e is then multiplied by A and a prior value of eA is added to eA to produce an estimate of Q.

Figure 1:
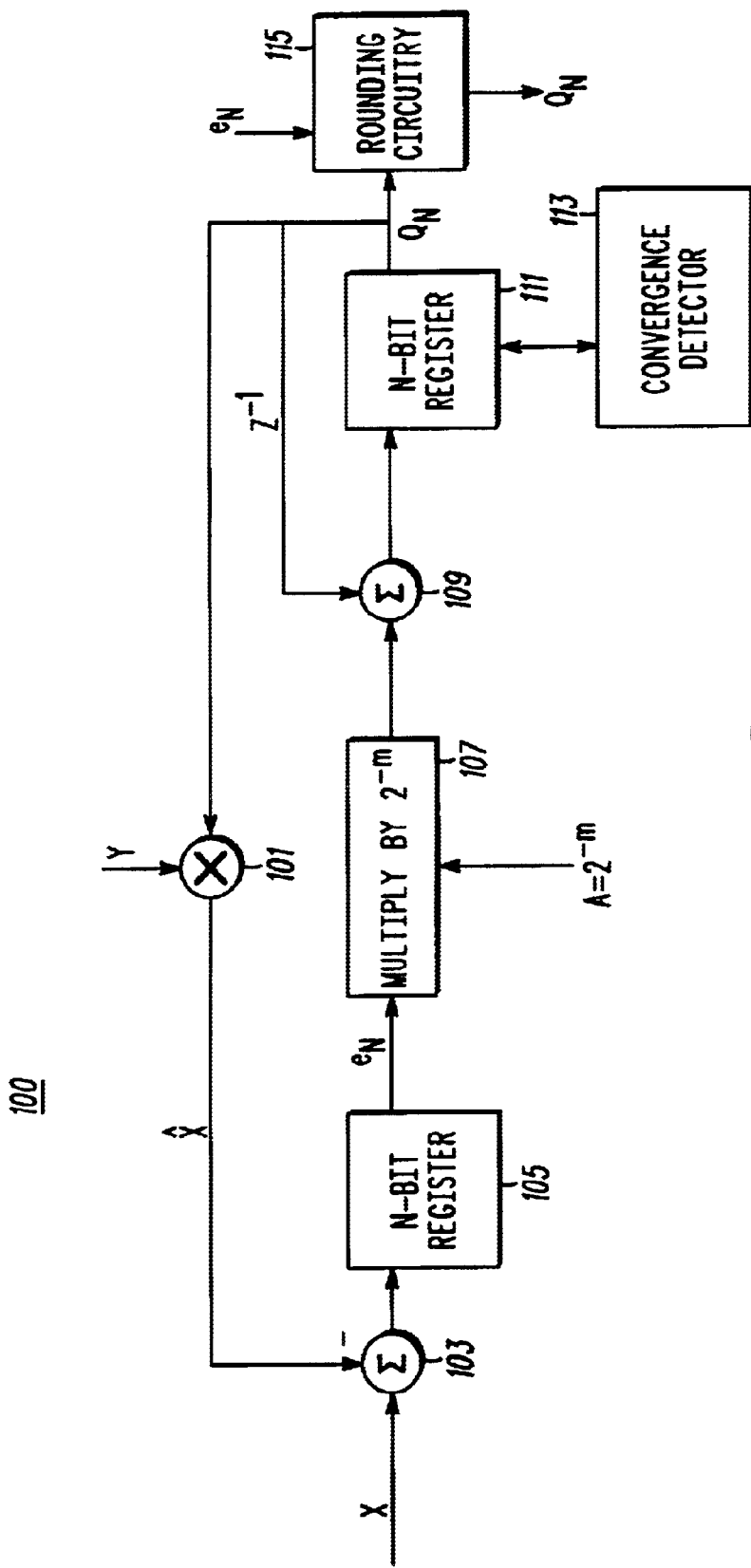
FIG. 1 is a block diagram of dividing circuitry in accordance with the preferred embodiment of the present invention.

Turning now to the drawings, wherein like numerals designate like components, FIG. 1 is a block diagram of division circuitry 100 in accordance with the preferred embodiment of the present invention. In particular, FIG. 1 is a block diagram of division circuitry 100 for a fixed-point implementation.

In the preferred embodiment of the present invention, division circuitry 100 serves to determine a value for Q, where Q=X/Y. The circuitry of FIG. 1 is best understood by considering the error term (e(n)) for Q, where, $$e(n)=X-YQ(n). \qquad (1)$$

Clearly, $$e(n) = 0 \text{ if } Q = \frac{X}{Y}.$$

The following discussion will show that for circuitry 100, e(n) converges for all operand values.

Using control theory, we can write the error in the z-domain as:

$$E(z) = \frac{X(z)}{1 + AY\frac{z^{-1}}{1-z^{-1}}} \qquad (2)$$

where,

E(z) is the z-transform of the error term,

X(z) is the z-transform of the input dividend (a step function with magnitude X), Y is the divisor, and A is the loop gain.

From control theory it well known that a first-order loop will converge with zero error when a step input is applied. That is, $$\lim_{n\to\infty} e(n) = \lim_{z\to 1}(z-1)E(z) = z(1-z^{-1})\frac{X}{(1-z^{-1})}\frac{1}{1+AY\frac{z^{-1}}{(1-z^{-1})}} = 0$$

Therefore, the loop will converge to the correct solution.

Rewriting the error term in equation 2 as:

$$E(z) = \frac{X(z)(1-z^{-1})}{1-(1-AY)z^{-1}}$$

it is clear that E(z) has a pole at (1−AY), hence with for a step input, X(z)=1/(1−z$^{-1}$), $$e(n)=X(1-AY)^n. \qquad (3)$$

Stability requires that $$0 \leq AY \leq 2.$$

Also, it is clear that the rate of convergence is maximized as A approaches 1/Y. In fact the error is zero for a A=1/Y, n>0.

From these results it is clear that the gain, A, should ideally be set to 1/Y for each division. However, it can be demonstrated that fixed point non-linearities result in the occurrence of a limit cycle when A=1/Y and the remainder of X/Y is 0.5. Hence, A is constrained such that A<1/Y.

Note that the N bit output, $Q_N$ converges when $|Ae(n)|<0.5$. That is, the input to the integrator $Ae_N(n)=\text{round}(Ae(n))$ is 0 for $|Ae(n)|<0.5$, hence $Q_N(n)=Q_N(n-1)$. If $X=Y*\text{floor}(Q)+r$. Then $$Ae_N(n) = A[X - YQ_N(n)] \quad (4)$$
$$= A[Y*\text{floor}(Q) + r - YQ_N(n)]$$
$$= AY[\text{floor}(Q) - Q_N(n)] + Ar$$

In order for the converged error to be in the range $|e_N|<Y$, the quotient must be $$Q_N=\text{floor}(Q),\ e_N=r;\ 0\leq r<Y/2 \quad (5a)$$

or $$Q_N=\text{floor}(Q)+1,\ e_N=r-Y;\ Y/2\leq r<Y \quad (5b)$$

For case (5a), using equation (4) convergence requires $$Ae_N=Ar<A(Y/2)<0.5$$

or $$AY<1 \quad (6a)$$

For case (5b), using equation (4) convergence requires $$Ae_N=A(r-Y)<-0.5$$

or $$A(Y-r)<A(Y/2)<0.5$$

or $$AY<1 \quad (6b)$$

Finally since convergence should occur if and only if $$-1\leq\text{floor}(Q)-Q_N\leq 0,$$

along with the constraints of (5a) and (5b) we require $$|Ae(n)|\geq 0.5 \text{ if floor}(Q)-Q_N>0 \text{ for all } r:$$

$$AY[\text{floor}(Q)-Q_N]+Ar\geq AY[\text{floor}(Q)-Q_N];\ 0\leq r<Y \geq AY\geq 0.5$$

so along with 6(a) and 6(b) we have the constraint that for the circuitry 100 of FIG. 1 (fixed-point)

$$0.5\leq AY<1.$$

Note that if A=1/Y the breakpoint between cases (5a) and (5b) is centered at r=Y/2. However, as mentioned above non-linearities introduced by quantization results in limit cycles at r=Y/2.

As a practical matter in the preferred embodiment of the present invention the gain will be a power of 2, i.e, $A=2^{-m}$ (assuming $Y\geq 1$). Then m is selected as $$\min[m:\ 0.5\leq 2^{-m}Y<1].$$

A simple algorithm to find m shifts the divisor, Y, right until floor[Y>>m]=0, incrementing m by 1 each shift. However, by applying a binary search for the highest order non-zero divisor bit, the maximum number of clocks required to calculate m for an N bit divisor may be reduced from N to $\log_2(N)$.

Since $A=2^{-m}$ and $e(n)=(1-AY)^n$, for any given pair of dividend, X, and divisor, Y, maximum convergence time occurs for $Y=2^k$ since the loop gain is 0.5. If $Y=2^k-1$, AY is very close to 1, resulting in minimal convergence time.

Referring to FIG. 1, divider circuitry 100 comprises multiplier 101, summers 103 and 109, N-bit registers 105 and 111, gain circuitry 107, convergence detector 113, and rounding circuitry 115. In the preferred embodiment of the present invention N-bit registers 105 and 111 serve to store the current error term (e(n)) and integrated error, respectively.. Operation of divider circuitry 100 occurs as follows:

As discussed above, circuitry 100 serves to determine a value for Q, where Q=X/Y. In order to function properly, a proper value for A is determined. In theory the optimal value for A is 1/Y, however to determine this requires a division itself. As discussed above, A is determined such that $0.5\leq AY<1$, and is chosen based on the most significant bit of Y. More particularly, $A=2^{-m}$, where m is the location of the most significant non-zero bit in Y plus 1. For example, if Y=001010101, then m=7. This assures that 0.5<=AY<1.

Once, A is determined, Y enters multiplier 101 and is multiplied by the estimate for $Q_N$. Since $YQ_{(n)}=\hat{X}_{(n)}$, (an estimate for X during the nth cycle) multiplier 101 outputs an estimate for X to summer 103 where it is subtracted from X, resulting in an error term $e_N$. The error term is shifted onto register 105, and exits register 105 to the gain circuitry, where it is multiplied A.

As discussed above A is chosen to be a negative power of 2 so that multiplication is carried out in a simple manner. In particular, since multiplication by $2^{-m}$ (in a base 2 system) requires bit shifting by m, circuitry 107 can be very simply implemented as bit-shifting circuitry. The resulting value of $Ae_N(n)$ is output from gain 107 and enters summer 109 where it is summed with $Ae_N(n-1)$ to produce an estimate of Q. The estimate of Q is then shifted onto register 111. At this point, convergence detector 113 determines if convergence has occurred.

In the preferred embodiment of the present invention convergence detector 113 determines if convergence has occurred by counting the number of cycles (n) that circuitry 100 has executed. In particular, the estimate for Q ($\hat{Q}$) will always converge to Q (to within a specific tolerance(T)) after Z cycles. Therefore, based on a specific tolerance (T), one will be assured that $Q-\hat{Q}<T$ after Z iterations. For example, for a 16-bit divide, 19 iterations is the worst case for $\hat{Q}$ to converge with T=0. If a tolerance T=4/65535 is sufficient, then $\hat{Q}$ will converge in less than 13 iterations. On average, $\hat{Q}$ will converge in about 4 iterations, no matter what the bit width.

Once convergence has occurred the output of register 111 is sent to a simple rounding operation. Although rounding can take place utilizing many differing rounding techniques, in the preferred embodiment of the present invention the remainder, $e_N$, is used to round $Q_N$ to minimize and center the final error such that $|Q-Q_N|\leq 0.5$. The in the preferred embodiment of the present invention:

if ($e_N>0$ & $e_N>Y/2$) $Q_{out}=Q_N+1$ else if ($e_N<-Y/2$) $Q_{out}=Q_N-1$ (Note, since $\pm Y/2$ may be calculated while the loop is converging, the final output is available one clock after convergence, indicated by e(n)=e(n-1).)

Figure 2:
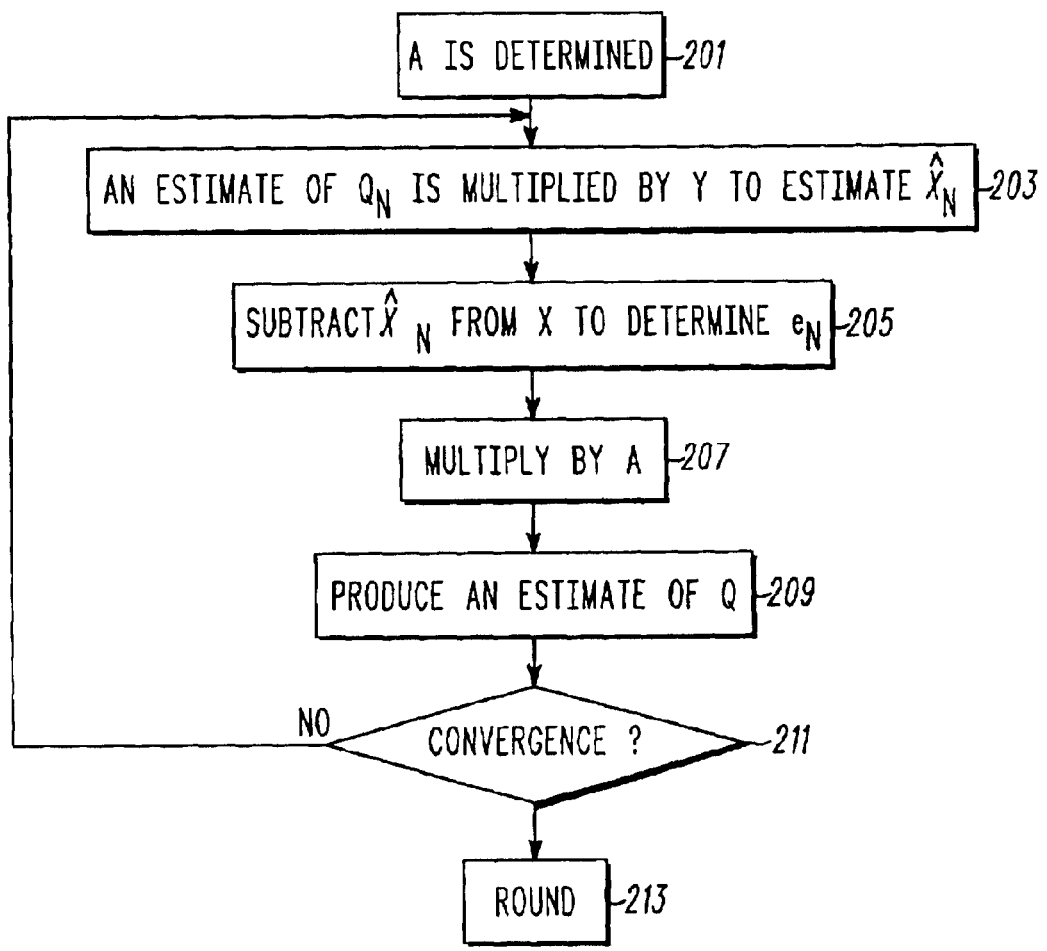
FIG. 2 is a flow chart showing operation of the divider of FIG. 1 in accordance with the preferred embodiment of the present invention.
Figure 3:
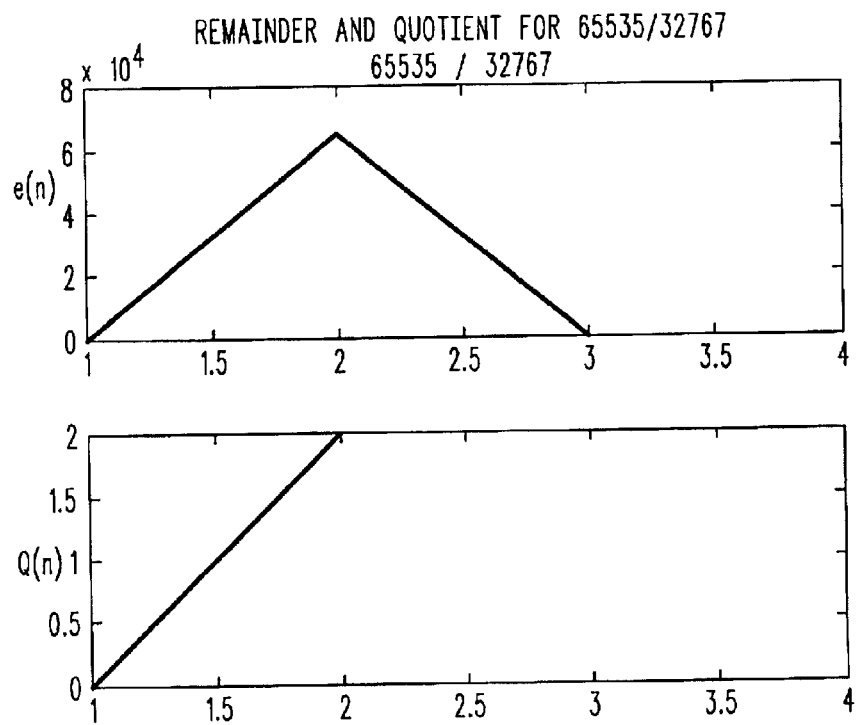
FIG. 3 through FIG. 7 illustrate the convergence of e(n) and Q(n) for various values of X and Y.
Figure 4:
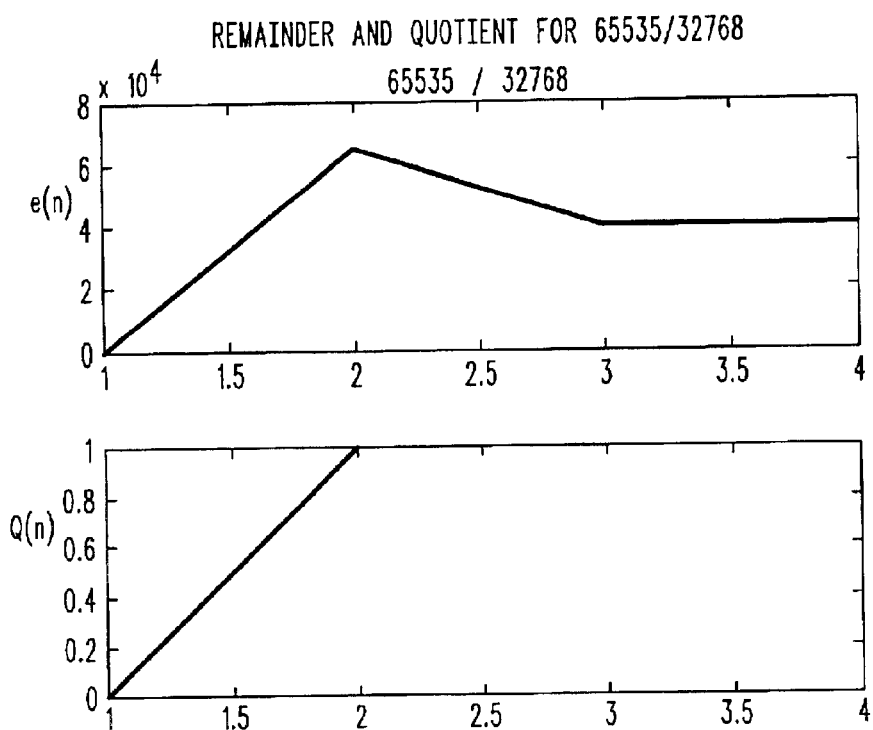
Figure 5:
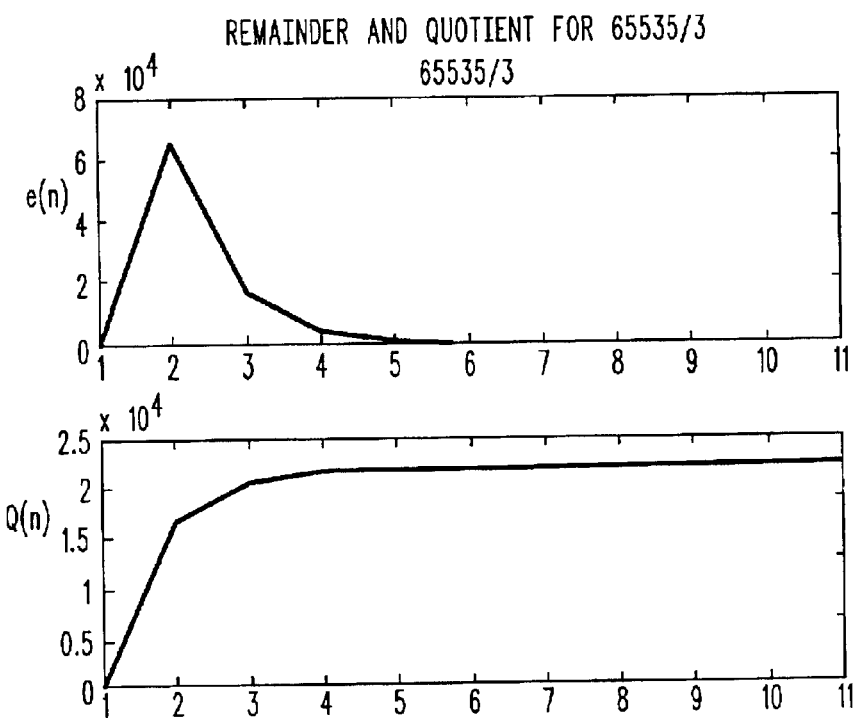
Figure 6:
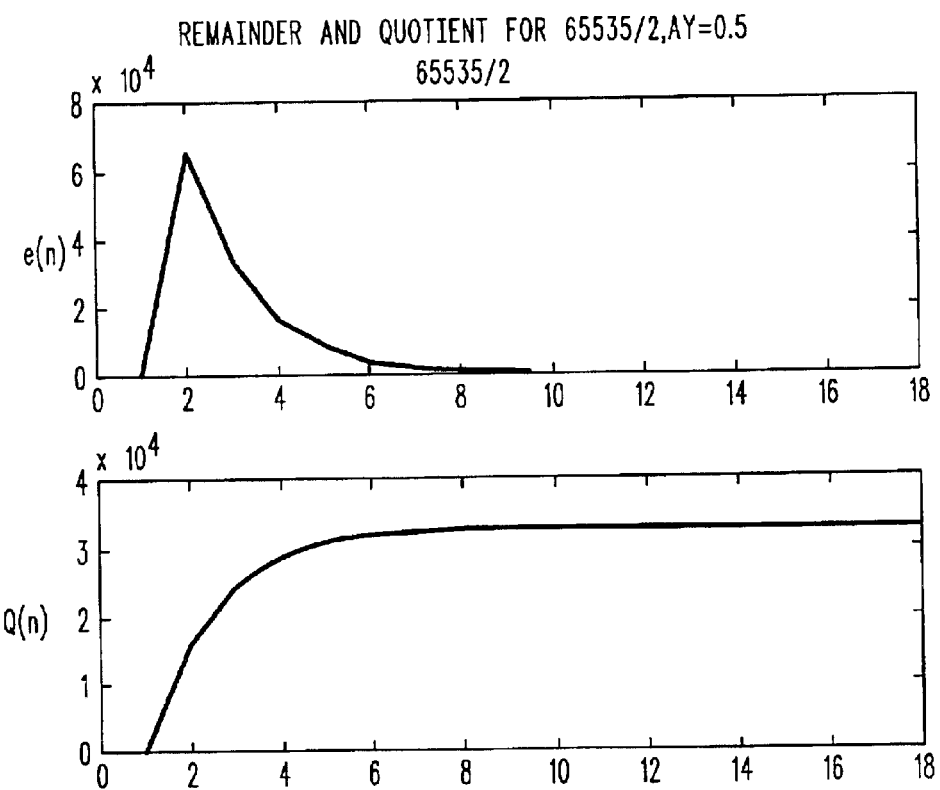

FIG. 2 is a flow chart showing operation of the divider of FIG. 1 in accordance with the preferred embodiment of the present invention. The logic flow begins at step 201 where a value for A is determined. As discussed above, A is chosen to be a negative power of 2 and is chosen based on the most significant bit of Y. At step 203 an estimate of $Q_N$ is multiplied by Y to estimate $\hat{X}_N$. The value of $\hat{X}_N$ is then subtracted from X (step 205) to determine $e_N$, which is multiplied by A (step 207). The value of $Ae_N(n)$ is added to $Ae_N(n-1)$ to produce an estimate of Q (step 209). At step 211, convergence detector determines if convergence has occurred, and if not the logic flow returns to step 203, otherwise the logic flow continues to step 213 where rounding takes place.

As discussed above, the time required to converge to the correct solution is independent of the operand bit width and is instead a function of the loop gain. That is, while the prior art execution time increases linearly with operand bit width, execution time can be made to remain relatively constant over operand bit widths. This results in dividing circuitry that requires relatively little processing time to execute, and yields a more accurate result than current approximation methods.

FIG. 3 through FIG. 7 illustrate the convergence of e(n) and Q(n) for various values of X and Y. Note there is no difference in convergence time for Y=32767 and 32768. However, as Y decreases, the convergence time for $Y=2^k$ verses $Y=2^k-1$ is evident, i.e., when Y=3, e(n) converges in 11 cycles, whereas e(n) converges in 18 cycles for Y=2. Note that the worst case convergence time for 16 bit operands occurs for X/Y=65535/1 and is 19 cycles.

Figure 7:
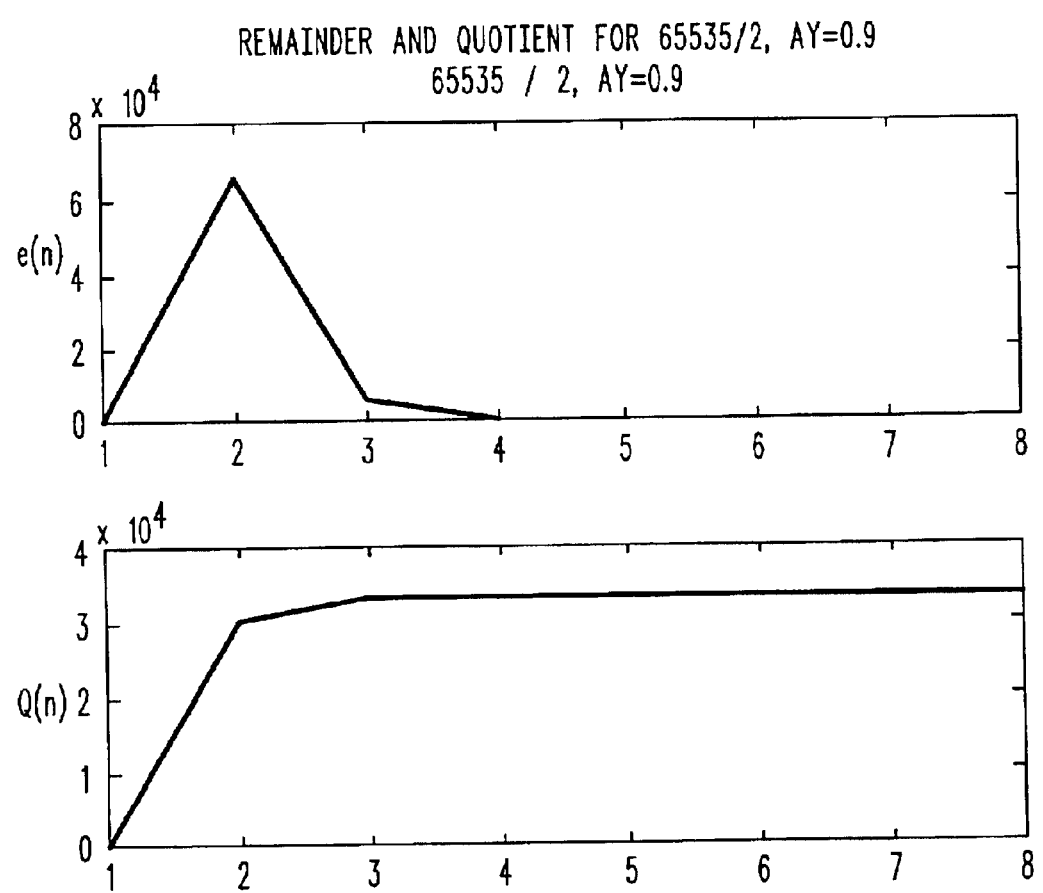

It is clear that restricting A to a power of 2 is sub-optimal with respect to convergence time. If the shifter in FIG. 1 is replaced with a multiplier, A may be made to approach 1/Y. The case of X/Y=65565/2 with A=0.9/Y is shown in FIG. 7. Note the convergence was reduced from 18 to 8 cycles.

While the invention has been particularly shown and described with reference to a particular embodiment, it will be understood by those skilled in the art that various changes in form and details may be made therein without departing from the spirit and scope of the invention. For example, instead of having convergence detector cycle through Z iterations, in an alternate embodiment, convergence detector continues circuitry cycling until $Q_N(n)-Q_N(n-1)\sim 0$ or $e_N(n)-e_N(n-1)\sim 0$. That is, convergence detector continues to cycle circuitry 100 until the value for Q or e remains unchanged. It is intended that such changes come within the scope of the following claims.

What is claimed is:

1. Dividing circuitry for dividing X/Y to produce Q, the dividing circuitry comprising:

a multiplier having Y as an input and outputting an estimate of X ($\hat{X}$);

a first summer having $\hat{X}$ and X as inputs and outputting an error (e);

a multiplier having e and a gain (A) as inputs and outputting a value of e multiplied by A; and a second summer having the value of e multiplied by A and the previous estimate of Q as inputs and outputting an estimate of Q.

2. The dividing circuitry of claim 1 further comprising rounding circuitry having the estimate of Q as an input and outputting a rounded estimate of Q.

3. The dividing circuitry of claim 1 further comprising a convergence detector for determining if Q has converged.

4. The dividing circuitry of claim 1 wherein $0.5 \leq AY < 1$.

5. The dividing circuitry of claim 4 wherein 0.5/A is chosen to have a same most significant bit as Y.

6. A method to determine a value of Q, where Q=X/Y, the method comprising the steps of:

determining a gain function (A);

multiplying an estimate of Q by Y to produce an estimate of X ($\hat{X}$);

subtracting $\hat{X}$ from X to determine an error (e);

multiplying e by A; and adding a prior value of eA to eA to produce the estimate of Q.

7. The method of claim 6 wherein the step of determining the gain function comprises the step of determining the gain function wherein $0.5 \leq AY < 1$.

8. The method of claim 7 wherein the step of determining the gain function comprises the step of determining the gain function wherein 0.5/A is chosen to have a same most significant bit as Y.

9. The method of claim 6 further comprising the step of determining when Q has converged.

10. The method of claim 6 further comprising the step of rounding Q.

* * * * *